US011315560B2

(12) United States Patent
Heltewig et al.

(10) Patent No.: US 11,315,560 B2
(45) Date of Patent: Apr. 26, 2022

(54) METHOD FOR CONDUCTING DIALOG BETWEEN HUMAN AND COMPUTER

(71) Applicant: Cognigy GmbH, Duesseldorf (DE)

(72) Inventors: Philipp Heltewig, Duesseldorf (DE); Sascha Poggemann, Duesseldorf (DE)

(73) Assignee: COGNIGY GMBH, Duesseldorf (DE)

( * ) Notice: Subject to any disclaimer, the term of this patent is extended or adjusted under 35 U.S.C. 154(b) by 126 days.

(21) Appl. No.: 16/630,912

(22) PCT Filed: Jul. 14, 2017

(86) PCT No.: PCT/DE2017/100587
§ 371 (c)(1),
(2) Date: Jan. 14, 2020

(87) PCT Pub. No.: WO2019/011356
PCT Pub. Date: Jan. 17, 2019

(65) Prior Publication Data
US 2020/0234700 A1 Jul. 23, 2020

(51) Int. Cl.
*G10L 15/22* (2006.01)
*G06F 40/205* (2020.01)
*G10L 15/26* (2006.01)

(52) U.S. Cl.
CPC .......... *G10L 15/22* (2013.01); *G06F 40/205* (2020.01); *G10L 15/26* (2013.01); *G10L 2015/225* (2013.01)

(58) Field of Classification Search
CPC .................................................. G10L 15/22
See application file for complete search history.

(56) References Cited

U.S. PATENT DOCUMENTS

| 6,766,320 | B1 | 7/2004 | Wang et al. |
| 6,964,023 | B2 | 11/2005 | Maes et al. |
| 8,543,407 | B1 | 9/2013 | Gagnon et al. |
| 8,600,747 | B2 | 12/2013 | Abella et al. |
| 8,849,652 | B2 | 9/2014 | Weider et al. |
| 8,977,584 | B2* | 3/2015 | Jerram ............ G11B 20/10527 706/46 |
| 9,235,978 | B1* | 1/2016 | Charlton ................. G08B 1/08 |
| 9,502,027 | B1 | 11/2016 | Wong et al. |
| 9,594,542 | B2* | 3/2017 | Gabel .................... G06N 20/00 |
| 9,633,317 | B2* | 4/2017 | Gabel .................... G06N 5/022 |

(Continued)

FOREIGN PATENT DOCUMENTS

| DE | 602004006641 T2 | 1/2008 |
| WO | WO 02073331 A2 | 9/2002 |

(Continued)

*Primary Examiner* — Seong-Ah A Shin
(74) *Attorney, Agent, or Firm* — Leydig, Voit & Mayer, Ltd.

(57) ABSTRACT

A method conducts dialog between human and computer using a self-learning system. The method includes: receiving user inputs in natural language text; mapping of synonyms and key words and word mapping; analyzing the user inputs regarding sentence structure and syntax and their recognition; mapping of key phrases; determining and classifying a user intent; checking if a confirmation is required; and logically processing in a reasoning and an answer preparation with a formulation of a decision on further dialog design, formulation or the dialog history with possible generation of a response.

17 Claims, 1 Drawing Sheet

(56) References Cited

U.S. PATENT DOCUMENTS

| | | | |
|---|---|---|---|
| 9,668,024 B2* | 5/2017 | Os | G06F 16/73 |
| 10,102,359 B2* | 10/2018 | Cheyer | H04L 63/10 |
| 10,474,961 B2* | 11/2019 | Brigham | G06N 5/02 |
| 10,699,717 B2* | 6/2020 | Orr | H04L 12/282 |
| 10,706,841 B2* | 7/2020 | Gruber | G10L 15/22 |
| 10,733,982 B2* | 8/2020 | Grupen | G06F 40/35 |
| 10,741,176 B2* | 8/2020 | Canim | G06N 5/02 |
| 10,741,182 B2* | 8/2020 | VanBlon | G06F 40/00 |
| 2007/0136067 A1 | 6/2007 | Scholl | |
| 2008/0307385 A1* | 12/2008 | Dreiling | G06F 8/38 |
| | | | 717/108 |
| 2011/0125734 A1* | 5/2011 | Duboue | G09B 7/00 |
| | | | 707/723 |
| 2013/0275164 A1* | 10/2013 | Gruber | G10L 17/22 |
| | | | 705/5 |
| 2015/0293755 A1* | 10/2015 | Robins | G06F 9/44526 |
| | | | 717/104 |
| 2018/0027006 A1* | 1/2018 | Zimmermann | H04L 63/0245 |
| | | | 726/11 |
| 2018/0047201 A1* | 2/2018 | Filev | G01C 21/3608 |

FOREIGN PATENT DOCUMENTS

| | | |
|---|---|---|
| WO | WO 2014047270 A1 | 3/2014 |
| WO | WO 2015179510 A1 | 11/2015 |
| WO | WO 2017097061 A1 | 6/2017 |

* cited by examiner

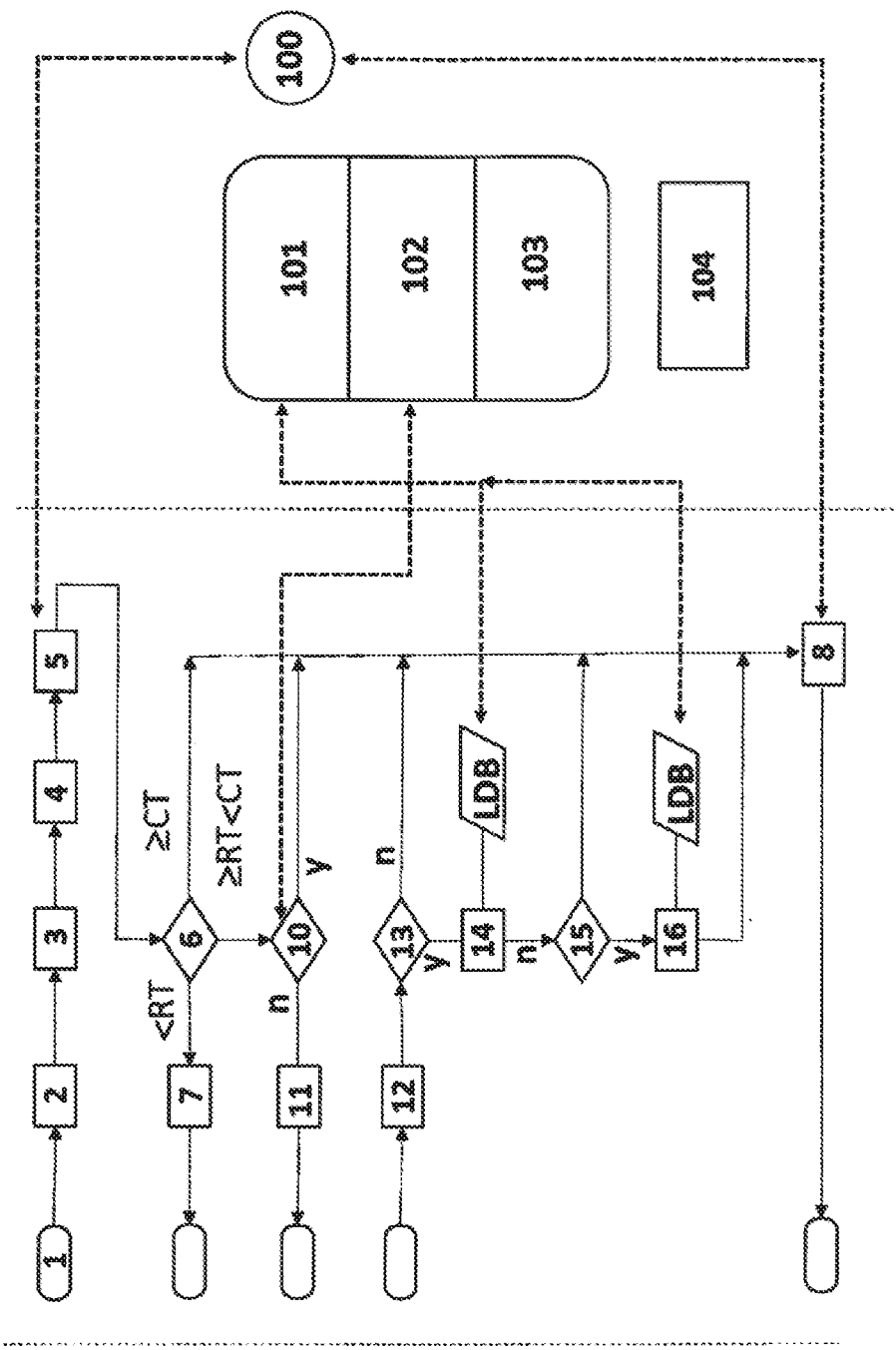
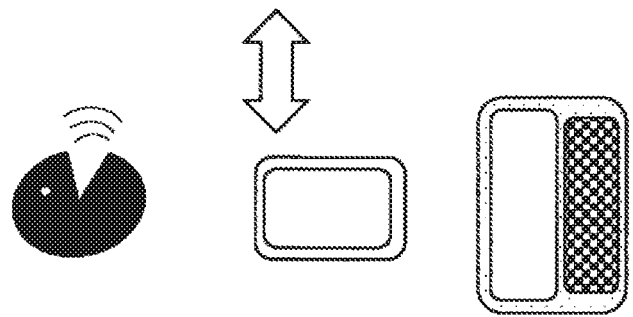

METHOD FOR CONDUCTING DIALOG BETWEEN HUMAN AND COMPUTER

CROSS-REFERENCE TO PRIOR APPLICATIONS

This application is a U.S. National Phase application under 35 U.S.C. § 371 of International Application No. PCT/DE2017/100587, filed on Jul. 14, 2017. The International Application was published in German on Jan. 17, 2019 as WO 2019/011356 under PCT Article 21(2).

FIELD

The present disclosure relates to an implementation on a computer, which may also be a mobile phone, smartphone or other portable device, with a digital computing unit that allows the user to conduct a natural, everyday conversation with a computer system. By text or voice input, various steps for classification and subsequent speech understanding are performed, whereupon a conversation between the user and the computer system is enabled in a context-based manner in an application. In this case, special emphasis is placed on the recognition of user intent and its further processing. For this purpose, the method recognizes the meaning of the speech in each case.

BACKGROUND

Computer systems that deal with spoken or written natural language have been state of the art for a long time. For example, there are dictation systems that can recognize spoken words and punctuation and convert them into written text. On the other hand, there is a variety of reading systems that can announce a given text. These systems are unable to understand the meaning of the speech.

Navigation devices in vehicles are also usually able to give the driver, who has entered a destination, instructions in spoken language for driving. However, they do not know if the user understood the instructions. These systems also cannot understand the user but depends on his destination input. From the start, they only allow destinations that are stored in the inbuilt database.

Sophisticated computer systems that can analyze spoken questions and provide answers in spoken language have also been available for some time. These are simple queries whose complete answers are stored in databases and for which the computer system is merely faced with the task of finding and speaking the correct one of these answers. To this end, the computer system does not really have to understand the meaning of the question, it is sufficient to recognize certain key words by which the set of possible answers can be limited to such an extent that the answer with the greatest numerical match of the key words can be output in response.

For example, U.S. Pat. No. 6,964,023 B2 describes a system for multimodal user conversations that is capable of converting spoken language into text, resolving ambiguities and recognizing the mood of the user, for example by means of face recognition. The system initiates, if necessary, inquiries to the user to clarify his instructions. In doing so, the system keeps asking until it recognizes the intent of the user. Thereafter, the system executes corresponding instructions, for example, turns on the radio. The recognition process is based on face and speech recognition. An error probability is determined for each branch of the decision tree, both by comparison with a threshold and by linear regression. The decision trees are trained for word-dependent characteristics.

WO 02/073331 A2 provides a system architecture for commercial transactions in natural language in which users can inform themselves about products of a catalog. In this case, the system accesses a database for products and a database of user preferences and asks questions for clarification. The database of user preferences has an update function, but a self-learning function is missing.

U.S. Pat. No. 8,600,747 B2 describes a method for managing a dialog, which may also include spoken language, such as in the context of a telephone call. For this purpose, a large number of dialog motivators is used, which perform error handling, ambiguity treatment, acceptance and confirmation, missing information and continuation. Order and payment transactions are possible therewith; the system can ask the user questions. However, it is not self-learning and primarily serves to transfer users to human dialog partners.

DE 60 2004 006 641 T2 describes an audio dialog system that has speech recognition and an audio interface as well as a browser with access to contents and determines activation phrases. By applying a latent semantic analysis, the similarity between the user statements and the activation phrases is determined as a numerical value. When coupling the activation phrases and the contents a language model is trained. A recognition of intent does not take place.

U.S. Pat. No. 8,543,407 B1 describes a system that uses statistical modeling and formal logic to evaluate conversational input regarding data contents such as commands and dictations. For this purpose, a command dictionary and dynamic grammar are used for identification, the clarification of ambiguity and the extraction of commands; the system works in a context-sensitive manner and can address further user interfaces. However, it cannot recognize user intents and also cannot conduct any dialog with the user in this respect.

WO 2014/047270 A1 describes a method and a device for predicting the intent in an IVR (interactive voice response) when using natural language and solves the problem that the general terms used by the user are undergoing a change during concretization that makes it difficult for a system to ensure consistency. In this case, the intent of the user is compared with earlier intents and with the usual normal behavior of average users and its relative significance is estimated. Depending on this significance, value-based offers corresponding to preset thresholds are submitted to the user. Intent recognition thus becomes intent generation.

U.S. Pat. No. 8,849,652 B2 describes a system that includes voice-based and non-voice-based interfaces and uses user context, previous information and user data to create a natural user environment for users who want to ask questions or issue commands. However, it cannot recognize user intents and cannot adapt to them.

U.S. Pat. No. 9,502,027 B1 describes a method for processing the output of speech recognition. Here, after the conversion of the spoken language into text, the parsing, it is first examined whether it is a command. If this is the case, this command is executed, and if not, an inquiry is made to clarify the ambiguity. However, the process can neither recognize intents nor conduct natural dialog.

SUMMARY

An embodiment of the present invention provides a method that conducts dialog between human and computer using a self-learning system. The method includes: receiving user inputs in natural language text; mapping of synonyms and key words and word mapping; analyzing the user inputs regarding sentence structure and syntax and their recognition; mapping of key phrases; determining and classifying a user intent; checking if a confirmation is required; and logically processing in a reasoning and an answer preparation with a formulation of a decision on further dialog design, formulation or the dialog history with possible generation of a response.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows an overview block flow diagram of the entire method including the options.

DETAILED DESCRIPTION

While the technical problems posed thereby can now largely be considered to be solved, deep understanding and communication still pose considerable problems, especially regarding those computer systems that have to process voice signals very quickly in real time while at the same time having limited resources.

Above all, the requirements result in "understanding" and "interpreting" the user inputs. The goal here is always to pass the Turing test. The test is passed if the user can no longer distinguish or discern from the answers whether he has communicated with a human or a machine. Apart from pure speech recognition, the principles of human communication also have to be taken into account in this case, especially those that are dealt with in the transactional analysis of psychology, the computer system thus has to:
  respectfully approach "other people,"
  clarify expectations, especially the questions of what is at issue and what is wanted from each other,
  obtain information on the topic, not assess, ask open questions instead of giving alternatives, stop the flood of information and allow structuring and selecting,
  paraphrase or allow paraphrasing of important conversation contents,
  make interpretations as such clear, and use, identify, possibly offer them sparingly,
  communicate authentically and selectively according to the principle "Not everything that is true must be said, but everything I say must be true,"
  observe the 50% rule, which means that at least half of the energy needed to solve the problem is provided by the conversational partner,
  take stock and sum up what has been clarified and what has remained open, which questions have been raised and what next steps are pending, and
  be able to give feedback.

Embodiments of the present invention is enable the computer system to emulate human communication better and not only to capture and evaluate the language or even only its words and grammar, and thus to engage human users in a dialog.

In addition, the software should know some basic rules of strategic practice so that it cannot be easily deceived or tricked.

An embodiment of the present invention solves this problem by a method for conducting dialog between human and computer using a self-learning system, the method including:
  receiving user inputs in natural language text,
  mapping of synonyms and key words as well as word mappings,
  analyzing the user inputs regarding sentence structure and syntax and their recognition,
  mapping of key phrases,
  determining and classifying the user intent,
  checking if a confirmation is required,
  logically processing in a reasoning and answer preparation with the formulation of a decision on further dialog design, formulation or the dialog history with possible generation of a response,
wherein:
  in order to determine the user intent, the statistical relevance of belonging to a target intent is determined while retaining all metadata,
  the classification is performed using a classification algorithm for declaring intent, in which the decision tree, logic and speech understanding are linked via metadata,
  feedback is generated using previous user queries to the self-learning system,
  if the statistic relevance falls below a threshold, a user reconfirmation is generated as to whether the recognized intent was correctly understood,
  in this case, a response from the user is received and then analyzed regarding sentence structure and syntax and the user inputs are repeatedly split into factual content and metadata about the user, and the user intent is again determined and classified,
  the recognition result is delivered to the self-learning system,
  the self-learning system develops automatic system recommendations and/or decisions for improving intent recognition over several user interactions and keeps them ready for later use, and
  initiates the generation of the voice text response to the user if the statistical relevance exceeds a threshold, and otherwise causes a further inquiry.

The individual method steps are explained in more detail below.

First, the user is identified if possible. This can be done for example by means of a unique user ID. If the user has previously connected to the system, he is recognized and the conversation is resumed. If the user logs on again after an expiration time, the system generates a new instance based on the stored contextual information and lets the user start a new dialog. The user can connect via any interface, such as chat or voice, and then, with appropriate identification and authentication, the respective user context can be loaded.

Such a logon can be carried out in a manner similar to a forwarding of mobile radio signals between individual radio cells across channels and across interfaces, thus permitting the transfer of dialog between the individual channels. In the process, the system retains the context, the stored dialog status and the dialog history.

Receiving and then analyzing the user inputs regarding sentence structure and syntax and their recognition is done by a natural language parser that outputs grammatical information of a sentence, such as identified subjects, further information about each word, and a structure tree, also called dependency tree which indicates the relation between the individual words.

This structure tree is then further analyzed in the "Dependency Tree Parsing" processing step, wherein subject-predicate-object structures are generated as far as possible.

The processing of dependency trees and structural information extracted therefrom are combined with other existing metadata in order to use this information for determining the significance of a user input. This so-called input object, which contains additional information, makes it possible to remove the corresponding metadata from the input and to buffer them in the conversation-dependent context.

Therefore, a transformation takes place between the user input and the existing user context based on existing structural criteria, e.g., the language models as the basis of "dependency tree parsing."

Thereafter, the user intent is determined and classified in several stages. The user intent is to be understood in the following to mean a more far-reaching term than just a mere request, the request, referred to as a "query", representing a subset of the user intent. From the perspective of communication, the user intent does not only concern the goal of presenting a fact but also includes the objective of the user himself, who either wants to buy something or wants to obtain a release or a permit or information, or even make a complaint or file charges. Thus, the four language levels "factual level," "appeal level," "relationship level" and "self-disclosure level" become relevant.

For all these levels, the computer system should be able to form a corresponding conversation level or to develop it in a self-learning manner, and it should be able to execute them purposefully by means of structural criteria. This knowledge base is provided by a database of target intents, relevant contextual information and external data sources.

In this case, the statistical relevance of belonging to a target intent while retaining all metadata is determined in order to recognize the user intent. Subsequently, the classification is carried out using a classification algorithm for clarifying intent and meaning. In this step, the metadata and the processing logic, also referred to as flow, are combined to form a basis for a user-specific structured conversation technique.

The information previously included as input metadata was stored in structures, such as the data exchange format JSON, and are used in the subsequent step for intent recognition and recognition of meaning. How the context is structured depends on the application. This results in a further limitation of the previously determined metadata to a specific application, which makes possible a meaningful conversation technique according to the rules of proper conversation in the first place.

If the statistical relevance of a selected reference intent falls below a defined threshold, the system is able to formulate user reconfirmations in order to confirm or disprove the validity of the recognition. This type of inquiry and the storage of user feedback creates a cycle in which the system is independently able to improve its own behavior, i.e., to learn independently. This is carried out in the form that after a certain number of inquiries, no further inquiries are posed to any user. The system then has learned to interpret and map a previously unknown user query that did not match the reference intent.

In this case, not only a pure recognition is performed, but depending on the conversation status, meaningful intents matching the conversation are activated or deactivated in a targeted manner. For this purpose, an intent recognition dependent on the conversation status is carried out with a conversation status-dependent limitation of permitted or tolerated or meaningful intents. This achieves a serious improvement of the status-dependent intent recognition. Paired with the above described inquiry algorithm this creates a method in which initially only a few structural pieces of information are given and the system learns independently to conduct as natural a dialog with the user as possible.

The intent is recognized by statistical comparison. First, the user statement is broken down in a parsing system to triples that have the structure subject-predicate-object. The arrangement of the triples is represented in a dependency tree. All eligible triples suitable for processing are stored in the system, with each of the triples being assigned a statistical probability value. Within the framework of the learning system, this probability value is always adjusted; if several users consecutively cause the same triple, the probability is increased. The triple with the highest probability is chosen as intent.

After intent recognition, the "intent-clarification" processing step provides that, depending on the relevance of recognized and identified intents, an inquiry to the user is formulated so that any ambiguities of the user input are used by inquiry and again performing the processing steps described above to get a clearer statement on the intent and meaning of the user input. In case of ambiguities of the user input in relation to the reference intents, "intent clarification" clarifies whether the system has recognized the correct intent or not.

When generating the inquiry, the following method steps are performed:

Each reference intent is associated with one or more explicit inquiries. A script includes contents from the metadata and the context in a dynamically generated inquiry. Thus, the inquiry is adapted to the user input and a much more natural inquiry or other feedback to the user is generated.

After inquiring after the user, the computer system waits for a response. If no response is given, the system again inquires or aborts the user's query; if an answer comes, the computer system checks to see if it is provided by the same user, authenticates it, and the analyses and processing steps take place again. Prior thereto, it is ensured that the system waits for further user inputs in a valid state or that it actively prompts the user for a conversation by asking questions.

After successful intent recognition, the next processing step of "reasoning and answer preparation" is required. In this processing step, a context-related, structured dialog management appropriate to the application is made possible based on a logical decision matrix, a flow, a decision tree, a neural network or other implementation.

The decisive part of the "reasoning engine" is the graphical representation of a structure for dialog management. Via logical processing elements like conditions, such as "if," "else," "then," "switch case," and user interaction elements, such as "say," "say-once," "asYNQuestion" etc., a logical framework for an application-specific dialog is created. In this case, the "reasoning engine" manages the current conversation status of a discussion with the user, as well as previous discussions, in order to be able to act as a conversational partner according to user interaction. Conversational context determined from previous information can be used as a conversation basis.

This reasoning engine allows the use of the metadata from previous processing steps with decision criteria for a meaningful, context-related conversation technique. Previously executed processing steps provide the necessary metadata of one or more user inputs for processing in the reasoning engine.

The intent recognition occurs before processing in the flow. On the one hand, an inquiry to the user can be made directly from the intent recognition. On the other hand, inquiries to the user can also be formulated directly from the flow. The difference is that the intent usually does not already contain all possible specifications, which are then queried by the flow. This separation between intent and flow follows from the user's knowledge position, who often cannot adequately specify his specific intent out of ignorance of the possible design spectrum or because his decision-making has not yet been completed and he reserves alternatives.

For user interaction, replies or feedback to the user are generated from previous method steps or directly from the reasoning engine, allowing full bi-directional user interaction appropriate to the context of a conversation. In order to improve conversation quality, so-called "Natural Language Generation" [NLG] tools and frameworks can be used in the process.

The system already enables partially dynamic generation of responses from the context or from stored metadata. The inquiries are thus created from the context and are output to the user. At this point, the flow generates the four language levels "factual level," "appeal level," "relationship level" and "self-disclosure level" so that the dialog management meets the communicative demands.

Further embodiments of the invention provide that the reception of user inputs is preceded by a conversion of spoken natural speech into text. In addition, this precedent method step is used to gain further metadata about the dialog partner. Thus, it can be provided that metadata of the user are recorded in the conversion of spoken language into text and provided separately to the algorithm for intent recognition. The parameters hurry, emotion, language, dialect and person or combinations or parts thereof can be recorded as metadata. This includes splitting user inputs into metadata for factual content and metadata about the user. Variations that provide such metadata in addition to the ascertained text are already known from market-known speech conversion applications.

Furthermore, these metadata obtained from the natural speech of the user can serve as raw data for the intent recognition as well as for the subsequent logical processing and the parameters intonation, urgency and reassurance can be passed thereto. Sometimes it can thus already be concluded from the intonation whether a complaint or a purchase request exists. In the case of urgency, it may be useful to lower the thresholds for statistical relevance. Moreover, such metadata enable adapting the flow of conversation appropriately to user behavior, e.g. by differentiating between a purchase process, a consultation process or a complaint process.

Provided that the receipt of user inputs is preceded by a conversion of spoken natural speech into text, a further embodiment of the invention provides that the generation of the speech text response to the user is followed by a conversion of text into spoken natural speech in order to conduct a unified dialog. In such cases, it is necessary to uniquely authenticate each user at all times in order to ensure that the system responds to the same user who posed the query so that the dialog continues with the same person.

The system therefore allocates an identification record to each user in one embodiment, allowing access to user-dependent contextual information. In this way, it is also possible to conduct an interface-independent dialog; the context and the current conversation and dialog status persist and are always consistent in this case. When the user terminates the conversation by disconnecting from the system, it is first checked if there is a technical error and the context is cached. If the dialog was ended, the current dialog status is destroyed or deleted.

In addition to the feedback of spoken text, data can also be returned as control commands for an application. Interaction via speech can thereby be combined with real interaction on the screen, e.g. by displaying graphics or with a device, such as a robot, an "internet-of-things" device, or even a smartphone or a computer or a virtual or digital environment. This user interface is preferably designed to be able to generate multiple input signals consisting of text or speech and input data, such as control commands and metadata.

Control commands can also be processed directly from the metadata as data records, thereby influencing the course of the conversation from the context and using the flow elements, which control the conversation depending on the context, with the user. For example, a connected robot can greet the user when it detects movement. By means of a possible face recognition, such a robot could try to uniquely identify a user and his company. The system would then be able to create, based on existing contextual information, a dynamically generated greeting using the name and other contextual information and to convey it via the robot in the form of speech to the user.

Further embodiments of the invention relate to the way in which the self-learning system is embedded or engages in the method for dialog management. Thus, it can be provided that the metadata in the self-learning system are automatically combined, interpreted, consolidated and stored, wherein the user is responsible for taking into account the data protection concerns.

Self-learning systems are sometimes criticized for automating and incorporating unwanted user inputs unreflectively. This leads to abuse and damage, such as when groups of users ask nonsensical questions in order to manipulate the system, or when the system learns prejudices and defamations. In order to prevent this, it can be provided that upon certain key words, the self-learning system is supported by an administrator who the system automatically involves when key words or excessive demand occur. In the system described here, the flow and manageable contextual information ensure that the system is partially self-learning but does not change its actual behavior, since it still operates on the basis of predefined structures. The administrator can only intervene by controlling and can bring in new elements for enhanced or improved user dialogs.

Further embodiments of the invention relate to the speech analysis. It can be provided that the self-learning system is supported by synonym recognition. The synonym recognition goes hand in hand with the development of further contextual information so that key words can be identified, and the inputs are thus extended via temporary metadata according to the recognized key words.

Furthermore, it can be provided that by analyzing the sentence structure of user inputs in dependency parsing, a dependency mapping is developed.

Further embodiments of the invention relate to the integration and query of external databases. Thus, it can be provided that, in order to determine conversation-relevant data, such as contextual information or metadata, corresponding, linked databases are queried. These may be, for example, product databases of manufacturers or goods and their storage location in a shopping center. If these databases are in a foreign language, a translation program can also be used.

In a further embodiment of the invention, it is provided that the system for generating outputs via a markup language has access to the metadata and the context and thus can include that information in the feedback and general processing.

The invention is explained in more detail below with reference to a FIGURE.

FIG. 1 shows an overview block flow diagram of the entire method including the options.

The invention is explained in more detail below by way of example, but the invention is not limited to this example.

FIG. 1 shows the user input 1 as text. The user can make this input either by spoken language, which requires a subsequent program for the conversion from speech to text, or via a smartphone or a computer or another device. The conversion can also be integrated by means of a voice control in a smartphone, computer or another device. An upstream automatic translation is also possible. For unique user identification, a kind of authentication or user identification is also required. The user input, as well as the entire subsequent dialog, can also be mixed via different input channels.

In the first processing step "Synonym Mapper" 2, a synonym recognition takes place, wherein the text is checked for synonymous phrases given by the administrator. If such synonyms are found, the Synonym Mapper 2 creates metadata in which the original text is replaced by these synonyms without deleting the original data. This metadata record of the original sentence of the user is successively extended in the subsequent processing steps.

In the second processing step, "NLP" 3 (Natural Language Processing), the user inputs previously extended by metadata are analyzed regarding sentence structure and syntax. In detail, first:
  number words are determined and replaced by numbers,
  filler words are removed and contractions are expanded,
  spaces are removed,
  missing punctuation is added,
and it is analyzed whether the sentence is a question and if so, its peculiarities are extracted.

Thereafter, the result is put into an NLP parser, which assigns words and punctuation of a text to word classes, also referred to as "POS tagging," and the dependencies are determined in order to output the grammatical and syntactic relationships between the sentence components as data. Specially trained machine learning models can be used for the generic identification of sentence structures. Thereafter, the data generated by the parser are parsed to identify the subject, object, their relationship to each other, and their properties. In addition, the sentence type is determined, for example, whether it is a question or a statement. These data are added as metadata to the record of the previous step.

In the third processing step "Keyphrase Mapping" 4, a second pass of a synonym recognition takes place using the metadata obtained in the previous step. In addition, the frequency of their occurrence is counted. Furthermore, the negativity is evaluated, because it could also happen that the user precisely does not intend something, i.e. does not want it at all. Furthermore, a categorization is carried out so that the right context databases and possibly external databases can be involved for further processing. Furthermore, tags are given. "Keyphrase Mapping" 4 thus extends the existing metadata record by these meanings.

In the fourth processing step "Intent Mapper" 5, it is identified what the user wanted to express when he made his user input. The following scoring algorithm is used for this.

The "Intent Mapper" 5 first accepts all valid intents defined by the administrator and for each example sentence A provided by the administrator, it generates a pair P consisting of the sentence S of the user including the metadata provided and the example sentence A. To each of these pairs, the scoring algorithm assigns a similarity value W by making the following comparisons:

If A and S are identical, W gets the value 1. This also applies to the lemmatized form of S and the form of S in which synonyms have been replaced.

If no identity of A and S was found, a number of property comparisons are made, each resulting in a similarity value W between 0 and 1. These properties include subjects, relationships, objects, as well as their lemmata, questions types of who-how-what-where, the circumstance if it is even a question, conditions, negative adverbs and possibly other aspects.

The calculation follows, by way of example, the following scheme, where EQ stands for the result shares of the properties of the respective total value W:

If subject (A) and subject (S) are identical then EQ=1, otherwise EQ=0. This calculation can be done on the lemmatized version of the corresponding words. Now, the results of this first calculation are merged as follows.

$$W = EQ(subject)*0.1 + EQ(verb)*0.2 + EQ(object)*0.3 + EQ(question)*0.2 + EQ(negativity)*0.2$$

The number of parameters used here may vary depending on the use, and the weightings are also exemplary.

The scoring algorithm then checks for certain cases whether a value 0 should be assigned, for example if the example sentence is a question, but the user input is not, or if the subject, relationship and object do not match. In addition, if negativity is determined, the system could assign the value W of 0.

The scoring values Wi of the different pairs $P_i$ are then collected, stored in a table and sorted by size. This table is added to the metadata record.

Now, for each example sentence A and the user input S, this calculation is performed and the result of the calculation for the user input S is compared with all active intents and thus with a certain number of example sentences A. The example sentence with the highest relevance is selected. By the example sentence belonging to a specific intent, the intent mapping takes place.

In the next processing step "Examination of the Intent Score" 6, it is checked if an inquiry to the user is required, and if so, how. For this purpose the administrator sets two thresholds between 0 and 1. The first value is the inquiry threshold RT and the second threshold is the validity threshold CT, the threshold CT being higher than that of the RT.

The two thresholds RT and CT divide the range of scoring values W into three ranges. If the first threshold RT is not reached, the program tells the user that it did not understand him and politely asks him request 7, to reformulate his input. If the second threshold CT is reached or exceeded, the intent is considered to be valid and an inquiry is dispensed with; the program then continues with flow 8.

If the first threshold RT is reached, but the second threshold CT is not yet reached, the program performs a deeper examination using its learning system and its databases. The learning system starts after the Intent Mapper 5 and is connected to a database 100, which consists of three parts: user data 101, context data 102 and general, external data 103; in addition, the learning system is possibly connected to the APIs 104.

The part of the user data 101 contains data about the respective user and data of all users from previous user inputs and has a separate learning database for each individual user as well as a common learning database for all users together. The respective learning databases contain the already processed data of previous dialogs including the related metadata and a counter indicating how many times each sentence containing a recognized intent has occurred by the respective user and by all other users. The learning system acts as follows:

After the scoring value W has been determined, it is first checked in query 6 whether CT was reached or exceeded, or not. In this case, the program continues without intervention in the learning system with the next processing step 8. If W is between RT and CT, it is checked in the user data 101 in the examination of previous confirmations 10 whether the user has already previously confirmed such an input sentence in a comparable context. If this is the case, no inquiry to the user is formulated; rather, the system "thinks" that the user again means the guessed input and increments the counter for this recognized sentence by 1. The program also continues with flow 8.

If not, the program takes the example sentence A, which belongs to the highest scoring value W, formulates therefrom a confirmation question in User Reconfirmation 11 and asks the user if this is his intent.

If the user denies this in his response 12, the program confirms that the intent has not been understood and, if other example sentences have also reached RT, whose score W was however lower than the previous one, then tries to ask the user if these example sentences better match his intent. Otherwise, the program continues with Flow 8, but sets a "flag" in the input object, indicating that the user's intent could not be properly determined. In this way the Flow 8 can appropriately react to the input and continue the user dialog.

Of course, the user in this case can also, at any time, resort to a reformulation, for which the original process then starts all over again. If no confirmation is reached by these inquiries, the learning system checks for each of the (unsuccessful) inquiries whether the user's sentence was already stored as a learning sentence in the learning database LDB.

If this is the case, the associated counter is decremented by 1, unless it was already at 0. In this way, the system reduces the risk that misunderstandings are passed on.

On the other hand, if the user agrees, it is confirmed that this sentence means the intent and the counter is incremented by 1 for this user and this sentence. In addition, in the processing of answer 14, it is checked whether this sentence has already been confirmed as intent in previous queries of other users and stored as a learning sentence in the learning database LDB. If such a learning sentence already exists, its counter is increased by 1; if not, it is created as a learning sentence in the learning database LDB.

Thereafter, in the step "Examination for example sentences" 15, it is checked whether the learned sentence is suitable as a new example sentence for further cases. In this case, if the counter in the learning database LDB exceeds a value LT specified by the administrator, the program removes the learning sentence from the learning database in the "Modification LDB" step 16 and, in the future, keeps it as an example sentence so that a direct recognition takes place. Here, the new example sentence is marked as such in order to allow the administrator to retrieve this example sentence and, if necessary, manually delete it. This avoids abuse.

The program now continues with the processing step "Flow" 8. Flow 8 is a decision tree that enables you to create meaningful statements during a dialog with a user. The Flow 8 uses the stored context data 102 and the status of the conversation in order to achieve a human-like user dialog. The context is used to store information about everything related to the current user and the dialog with him, for example the name of the user after he has given it. The context data 102 are stored and are then available for future user conversations. The status determines where you are in the conversation, for example, at the beginning, the end, or in a specific processing step. The status information is crucial for appropriate answers, since identical user inputs can have completely different meanings depending on the current dialog status.

The Flow 8 has direct configuration access to external data sources, external data 103, and external APIs 104, and can include these in the context and a conversation.

The Flow 8 consists of a number of different nodes that determine the logical structure for structuring a conversation and generating the desired outputs. These are a start node that determines the beginning of a flow, function nodes that perform a specific function, for example, output a statement to a user or make an entry in a database, logic nodes that structure the flow within the flow, for example, if/then/else or switch/case/default, and code nodes containing executable code, such as JavaScript. Using these nodes, the Flow 8 can record the current user input, the context and the status, preferably by means of a script language activated at runtime.

Such a script language activated at runtime typically consists of a markup language with tags tagging portions of text or data. Furthermore, this script language activated during runtime makes it possible to form corresponding queries to databases with external data 103 and allows direct queries to these data sources from the flow nodes. Synchronously in the form that any queries are first answered before the Flow 8 continues to process, or asynchronously in the form that the processing of further flow queries is performed immediately. The processing in the Flow 8 after an asynchronous database query takes place as soon as the queried external data 103 are present, the flow of the still valid Flow 8 is continued with the new data now available. In a similar procedure, external programming interfaces APIs 104 can also be accessed here.

Each flow starts with a start node followed by any number of child nodes. All nodes are executed in sequence starting from the start node as soon as they are reached. Logic nodes leading to branches control the flow and ensure that only relevant nodes are activated during a conversation. Thus, it may occur that some nodes in the course of a dialog are passed through repeatedly or not at all. This constellation results in a free, but structured, dialog.

It is of particular advantage to use within the Flow 8 a markup language that makes it possible to call or change the metadata regarding user inputs, the context and the status directly within the decision tree. The access takes place, for example, via different nodes or via free programming.

In the following, the interaction is described in more detail by means of a simple example. Consider a larger group of visitors of a shopping center who are a little hungry. The first visitor speaks to the system with the words: "I want a snack, where can I find it?" At first, this spoken sentence is converted into text by means of known technology; since the access can be made by several consecutive users, the currently active dialog is assigned an identification number and a new default conversation context is loaded. Subsequent user interactions within an active dialog take place by using this conversation context. If a new user then has a conversation, a new default conversation context is loaded again.

This text input 1 starts the system. In the Synonym Mapper 2, synonyms or broader terms are found for the term "snack;" for example, the term "pizza" is found and loaded from the user-added dictionary. There, a key word with a unique identifier, which can be used later in the flow, and a freely definable number of associated synonyms, is created. In the subsequent step NLP 3, the input is examined word by word and the relationship between the words is also examined. In this case, it is recognized that they are two half-sentences, the last of which is a question aimed at a location. The subject of the first half sentence is the user himself; the object is a food item. A number was found: the word "a". The verb could indicate a relationship status that contains an intent. However, the questioning sentence could also be an intent.

In the step "Keyphrase Mapping" 4 it is first checked whether something is negated; this is not the case here. The categorization is specified in more detail; the items are a food item and a location.

In the step "Intent Mapper" 5, the example sentences A for food and for location are loaded and pairs are formed. For example, for "snack," there are sandwiches, pizza and chips with corresponding example sentences A from the synonym database. For location, no example sentence can be loaded because of the reference "it," as the object follows only from the first half-sentence, which is first to be clarified. For each of these example sentences A, a scoring value W is assigned. These scoring values can be roughly proportional to the typical local sales, other assignment modalities, such as references to current advertising activities, are conceivable.

In the present example, there is no example sentence A with "snack," so none of the example sentences has the scoring value W=1. The remaining example sentences may have the values W=0.6 for chips, W=0.7 for sandwiches and W=0.8 for pizza, which was previously set by the administrator; also set were a CT value for inquiries no longer to be confirmed and RT=0.5 for unintelligible user input.

In the following step "Examination of the Intent Score" 6 it is checked whether the highest scoring value of the example sentences exceeds the value CT. This is not the case here. Then it is checked whether this highest value is at least above RT, which is the case. The system then checks in step 13 whether there is already a confirmation from a previous user input for this user and for such a user input. If this is the case, no further search is made for a confirmation, but the user input is regarded as confirmed and the system proceeds to the Flow 8 as the next step.

Care must be taken with such skipping of the confirmation, and the Flow 8 subsequently checks from the context as well as the status whether skipping the confirmation was really appropriate; for example, the same user could come back later and ask for another snack. Since he now knows the place where he can get pizza, his expectation would then be that he is now offered something different, otherwise he would not have asked. Therefore, the second, identical question does not automatically have to contain the same expectation regarding the answer but can also express a different intent depending on the status; however, this clarification is not the object of the Examination of the Intent Score 6 but of the Flow 8.

If there is no past confirmation from this user, the program initiates inquiry 11 associated with the example sentence of the highest scoring value W. In the present example, this is the sentence "Would you like a pizza?" The program expects a yes-no answer. If the answer is "yes," the program checks for the second half-sentence whether there is an example sentence with a value of 1 for this; in this example, this is assumed and no further inquiry is necessary. The program also continues to the flow here but previously stores the sentence in its learning database LDB, which is part of the user database 101 so that it can recognize the question the next time.

In addition, the program checks whether it already knows the question about the snack from other user queries. If this were the case, it would increment the counter in the learning database by 1 for all users, but in the present example, the sentence is first newly created in the learning database. For this reason, the query as to whether the threshold LT for the transfer to the database for example sentences to the database for reference or example sentences for intents has also been exceeded is not necessary.

The program then continues with Flow 8, which generates a response where to get a pizza, possibly in the form of a list if there are several places that it knows for this case. It possibly also asks for the toppings wanted and immediately places a complete order that the system then can forward to a digital ordering system. In this case, the Flow 8 can access, per configuration, further application-specific external data 103 or programming interfaces APIs 104.

In the present case, the second user then asks, "I also want a snack but not pizza." The first steps are analogous, but there is no second half sentence with a location question, and there is also a negation that is identified in the Keyphrase Mapping 4, if it has not already been identified in the previous step NLP 3. Since a negation of pizza is included, the example sentence with the pizza is given the scoring value 0. In the following step "Intent Mapping" 5, it is only asked "Would you like a sandwich?" If the user affirms this, the procedure continues analogously as in the previous case. Only in the Flow 8, the program determines that there was no question for a location and asks further questions in this respect; possibly, it also offers the user a corresponding direct order.

The learning database then has two different confirmations, each with a counter status 1, for the question about the snack. If the group makes further similar queries, the system learns by increasing or reducing the counter and including all the context data and metadata, what the users mean and want.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 User input
2 Synonym Mapper
3 NLP
4 Keyphrase Mapping
5 Intent Mapper
6 Examination of the Intent Score
7. Request
8. Flow
9. (empty)
10. Examination of previous confirmations
11. User Reconfirmation
12. Response from the user
13 Examination of the answer
14 Processing of the answer
15 Examination for example sentences
16 Modification LDB
100 Database
101 User data
102 Context data
103 External data
104 External programming interface API

The invention claimed is:

1. A method for conducting dialog between a human and a computer using a self-learning system, the method comprising:
  receiving user inputs in natural language text;
  mapping of synonyms and key words and word mapping;
  analyzing the user inputs regarding sentence structure and syntax and their recognition;
  mapping of key phrases;
  determining and classifying a user intent;
  checking if a confirmation is required; and
  logically processing in a reasoning and an answer preparation with a formulation of a decision on further dialog design, formulation or the dialog history with possible generation of a response,
  wherein in order to determine the user intent, a statistical relevance of belonging to a target intent is determined while retaining all metadata,
  wherein the classification is performed using a classification algorithm for declaring intent, in which a decision tree, logic, and a speech understanding are linked via the metadata,
  wherein feedback is generated using previous user queries to the self-learning system,
  wherein a predetermined validity threshold value for recognizing the user intent is checked against the determined value of statistical relevance,
  wherein based upon the validity threshold value falling short of by the value of statistical relevance, a query is generated to the user as to whether the recognized intent was correctly understood, in this case, a response from the user is received and then analyzed regarding sentence structure and syntax and the user inputs are repeatedly split into factual content and metadata about the user, and the user intent is again determined and classified,
  wherein the recognition result is delivered to the self-learning system,
  wherein the self-learning system develops automatic system recommendations and/or decisions for improving intent recognition over several user interactions and keeps them ready for later use, and
  wherein the method initiates the generation of the language text response to the user if the validity threshold value is exceeded by the value of statistical relevance, and otherwise causes a further inquiry.

2. The method according to claim 1, wherein the reception of user inputs is preceded by a conversion of spoken natural language into text.

3. The method according to claim 2, wherein, when converting from spoken language into text, the metadata of the user are recorded and provided separately to the algorithm of intent recognition.

4. The method according to claim 3, wherein the user inputs are split into metadata for factual content and into metadata about the user.

5. The method according to claim 3, wherein the recorded metadata comprise a hurry parameter, an emotion parameter, a language parameter, a dialect parameter, a person parameter, or combinations or parts thereof.

6. The method according to claim 3, the method comprising providing, as the metadata, an intonation parameter, an urgency parameter, and a reassurance parameter to the algorithm of intent recognition.

7. The method according to claim 1, wherein:
  a query threshold value for recognizing the user intent is predefined as a further threshold value, wherein the validity threshold value is higher than the query threshold value,
  the determined value of statistical relevance is checked against the query threshold value and against the validity threshold value, wherein the determined range of the values W is divided into three ranges,
  a request is directed to the user to reformulate the user's input based upon the query threshold value being exceeded by the determined value of statistical relevance,
  a query is formulated to the user based upon the query threshold value being exceeded and the validity threshold value being exceeded by the determined value of statistical relevance, and
  the method comprising initiating the generation of the language text response to the user based upon the validity threshold value being exceeded by the value of statistical relevance.

8. The method according to claim 1, the method comprising automatically combining, interpreting, consolidating, and storing the metadata in the self-learning system.

9. The method according to claim 1, wherein the generation of the language text response to the user is followed by a conversion of the language text response into spoken natural language.

10. The method according to claim 1, wherein the self-learning system is supported by an administrator.

11. The method according to claim 1, wherein the self-learning system is supported by a recognition of synonyms.

12. The method according to claim 1, the method comprising developing a dependency mapping by analyzing the sentence structure of user inputs in dependency parsing.

13. The method according to claim 1, wherein databases or application program interfaces (APIs) are queried for determining conversation-relevant data.

14. The method according to claim 1, wherein the system for generating output via a markup language has access to the metadata and the context such that the system is capable of including the metadata and the context in the feedback and general processing.

15. The method according to claim 1, wherein a specific activation or deactivation of meaningful intents matching the conversation takes place by performing intent recognition depending on the conversation status with conversation status-dependent limitation of permitted or tolerated or meaningful intents.

16. The method according to claim 1, wherein the system comprises a user interface comprising a robot, an interne-of-things device, a smartphone, a computer, a virtual or digital environment, or a combination thereof.

17. The method according to claim 16, wherein the user interface generates, as the user inputs, multiple input signals consisting of text or speech and input data.

* * * * *